United States Patent
Long et al.

(10) Patent No.: US 9,007,996 B2
(45) Date of Patent: Apr. 14, 2015

(54) SERVICE CONTROL METHOD AND APPARATUS

(75) Inventors: Shuiping Long, Beijing (CN); Hui Jin, Beijing (CN); Wenmei Gao, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 144 days.

(21) Appl. No.: 13/602,876

(22) Filed: Sep. 4, 2012

(65) Prior Publication Data
US 2012/0327859 A1 Dec. 27, 2012

Related U.S. Application Data

(63) Continuation of application No. PCT/CN2011/071181, filed on Feb. 23, 2011.

(30) Foreign Application Priority Data

Mar. 2, 2010 (CN) .......................... 2010 1 0126135

(51) Int. Cl.
*H04W 76/02* (2009.01)
*H04L 29/06* (2006.01)
*H04W 48/08* (2009.01)

(52) U.S. Cl.
CPC ......... *H04L 65/1016* (2013.01); *H04W 76/022* (2013.01); *H04L 65/1063* (2013.01); *H04L 65/1069* (2013.01); *H04L 65/1096* (2013.01); *H04W 48/08* (2013.01)

(58) Field of Classification Search
None
See application file for complete search history.

(56) References Cited

U.S. PATENT DOCUMENTS

| 6,956,943 | B1 * | 10/2005 | Goodrich, II et al. ... 379/399.01 |
| 7,212,518 | B2 * | 5/2007 | Gorhammar et al. ......... 370/352 |
| 7,929,946 | B2 * | 4/2011 | Rathus et al. ................. 455/411 |

(Continued)

FOREIGN PATENT DOCUMENTS

| CN | 101111086 A | 1/2008 |
| CN | 101409865 A | 4/2009 |

(Continued)

OTHER PUBLICATIONS

Tanida et al., "A Study on Media Stream Switching in Next Generation Network," IEICE Technical Report, vol. 108, No. 458, Institute of Electronics Information and Communication Engineers, Tokyo, Japan (2009).

(Continued)

*Primary Examiner* — Rhonda Murphy
(74) *Attorney, Agent, or Firm* — Leydig, Voit & Mayer, Ltd.

(57) ABSTRACT

In the field of mobile communications, embodiments of the present invention disclose a service control method and apparatus. A user equipment has established a circuit switched bearer, and the user equipment initiates a session with a third party. The method includes: receiving, by a service centralization and continuity application server SCC AS, early session media information and sending the early session media information to a circuit switched network in a form of regular session media, so that the circuit switched bearer is used for an early session; and receiving, by the SCC AS, an off-hook signal of the third party and sending regular session media information of the third party to the circuit switched network, so that the circuit switched bearer is used for a regular session.

26 Claims, 9 Drawing Sheets

(56) References Cited

U.S. PATENT DOCUMENTS

| | | | |
|---|---|---|---|
| 2008/0117893 A1 | 5/2008 | Witzel et al. | |
| 2010/0036958 A1 | 2/2010 | Mahdi | |
| 2010/0124897 A1 | 5/2010 | Edge | |

FOREIGN PATENT DOCUMENTS

| | | |
|---|---|---|
| CN | 101448222 A | 6/2009 |
| CN | 101827322 A | 9/2010 |
| EP | 2131613 A1 | 12/2009 |
| JP | 2011512703 A | 4/2011 |
| JP | 2012508993 A | 4/2012 |
| WO | 2009026818 A1 | 3/2009 |
| WO | 2009059559 A | 5/2009 |

OTHER PUBLICATIONS

1$^{st}$ Office Action in corresponding Japanese Patent Application No. 2012-555288 (Sep. 3, 2013).

"3$^{rd}$ Generation Partnership Project; Technical Specification Group Services and System Aspects Study on Architecture of IMS based Customized Alerting Tones (CAT); Stage 2 (Release 8)," 3GPP TR 23.872, Sep. 2008, V8.0.0, 3GPP, Valbonne, France.

International Search Report in corresponding international Patent Application No. PCT/CN2011/071181 (May 26, 2011).

Written Opinion of the International Searching Authority in corresponding International Patent Application No. PCT/CN2011/071181 (May 26, 2011).

"TS 23.292—3$^{rd}$ Generation Partnership Project; Technical Specification Group Services and System Aspects; IP Multimedia Subsystem (IMS) Centralized Services; Stage 2 (Release 9)," Technical Specification, Dec. 2009, V9.4.0, 3GPP, Valbonne, France.

"TS 24.182—3$^{rd}$ Generation Partnership Project; Technical Specification Group Core Network and Terminals; IP Multimedia Subsystem (IMS) Customized Alerting Tones (CAT); Protocol Specification (Release 9)," Technical Specification, Dec. 2009, V9.3.0, 3GPP, Valbonne, France.

"TR 29.882—3rd Generation Partnership Project; Technical Specification Group Core Network and Terminals; Customized Alerting Tones (CAT) in the 3GPP CS Domain; (Release 8)," Technical Report, Dec. 2008, V8.0.1, 3GPP, Valbonne, France.

"3GPP TS 44.057—3$^{rd}$ Generation Partnership Project; Technical Specification Group Core Network and Terminals; GSM Cordless Telephony System (CTS), Phase 1; CTS supervising system layer 3 specification (Release 9)," Version 9.0.0, 3$^{rd}$ Generation Partnership Project, Valbonne, France (Dec. 2009).

"3GPP TSG SA WG2 Meeting #79—Incorporate CAT suplementary service," Kyoto, Japan, Change Request, Version 9.5.0, Document S2-102535, 3$^{rd}$ Generation Partnership Project, Valbonne, France (May 10-14, 2010).

"3GPP TSG SA WG2 Meeting #77—Enhancement to SCC AS—SRVCC and CAT IWK," Shenzhen, China, Change Request, Version a.0.0, Document S2-100500, 3$^{rd}$ Generation Partnership Project, Valbonne, France (Jan. 18-22, 2010).

"3$^{rd}$ Generation Partnership Project; Technical Specification Group Services and System Aspects; IP Multimedia Subsystem (IMS); Stage 2 (Release 9)," 3GPP TS 23.228, V9.0.0, pp. 1-250, 3$^{rd}$ Generation Partnership Project, Valbonne, France (Jun. 2009).

"3$^{rd}$ Generation Partnership Project; Technical Specification Group Core Network and Terminals; IP Multimedia (IM) Core Network (CN) subsystem Centralized Services (ICS); Stage 3 (Release 9)," 3GPP TS 24.292, V9.0.0, pp. 1-164, 3$^{rd}$ Generation Partnership Project, Valbonne, France (Jun. 2009).

Rosenberg et al., "SIP: Session Initiation Protocol," Network Working Group, Request for Comments: 3261, pp. 1-269, Internet Society, Reston, Virginia (Jun. 2002).

Rosenberg et al., "An Offer/Answer Model with the Session Description Protocol (SDP)," Network Working Group, Request for Comments: 3264, pp. 1-25, Internet Society, Reston, Virginia (Jun. 2002).

* cited by examiner

SERVICE CONTROL METHOD AND APPARATUS

CROSS-REFERENCE TO RELATED APPLICATIONS

This application is a continuation of International Patent Application No. PCT/CN2011/071181, filed on Feb. 23, 2011, which claims priority to Chinese Patent Application No. 201010126135.4, filed on Mar. 2, 2010, both of which are hereby incorporated by reference in their entireties.

FIELD OF THE INVENTION

The present invention relates to the field of mobile communications, and in particular, to a service control method and apparatus.

BACKGROUND OF THE INVENTION

With the rapid development of an IMS (IP Multimedia Subsystem) in the field of telecommunication, an IMS network is becoming widely applied. However, the IMS network will not be fully deployed in a short period of time. Moreover, it is impossible to provide all CS (Circuit Switch) network users with new IMS terminals instead in a short period of time. Therefore, conventionally a CS network still has to coexist with the IMS network. As a result, simultaneous operation of CS and IMS service platforms increases the cost of constructing new services and the operating cost.

To meet a requirement of coexistence of the CS network and the IMS network at present, a CS network service logic function may be transferred to the IMS network to implement a united service platform, so as to reduce the cost of constructing and operating new services. Such technology is referred to as an ICS (IMS Centralized Service). The ICS may also be regarded as a new IMS session, in which the IMS session is supported to use a CS bearer (Bearer), which is alternatively referred to as a CS media, to transmit media streams, and multiple IMS sessions may share one CS bearer. The CS bearer is established through a CS call, where the CS call is converted into an IMS call by an MSC server (Mobile Switch Center server) or an MGCF (Media Gateway Control Function). An SCC AS (Service Centralization and Continuity Application Server) that supports the ICS is an IMS application based on a home network. A UE (User equipment) that supports the ICS establishes a service control channel with the SCC AS to transmit IMS service control signaling (such as call initiation, transfer and release), where the service control channel is based on a Gm interface or an I1 interface.

The terms "call" and "session" are not distinguished in this document, and are able to be replaced with each other.

CAT (Customized Alerting Tones), generally known as color ring back tones, are a service triggered in a phase of a session setup, and are capable of presenting multimedia information (such as one of or a combination of a speech, a video and a text) to a calling party to replace a conventionally used monotonous ringback tone (for prompting a ring to a called terminal). The CAT may also be regarded as a new ringback tone, which allows a user or an operator to customize media content of the ringback tone.

The CAT, which mainly transmits media streams before the called terminal sends an off-hook signal, belongs to an early session (or referred to as early media), and a regular session (that is, transmission of a normal call media streams) is performed after the off-hook signal. Another common type of early media is Announcement, for example, for prompting the user that "the network is busy, please dial again later". The early media mainly have three service models: a gateway model, a forking model and an early-session model. The early media may still exist after the off-hook signal. For example, the CAT media may serve as, for example, background music or a background video, after a normal session starts.

As regards implementing the early media (for example, a CAT service) during ICS session setup, the inventor finds the following problems:

While initiating setup of a first ICS session, an ICS UE also initiates setup of a CS call, where the CS call is converted into an IMS call by the MSC server or the MGCF. Therefore, the MSC server or the MGCF supports the early media at this time. However, when the ICS UE initiates a second ICS session, an existing CS bearer is reused, that is, a setup process of a CS call does not exist, and therefore, the MSC server or the MGCF does not support the early media.

As for a case of forking of the called party occurring in the setup of the ICS session, the following problems exist:

Similar to the early media, the forking is also a mechanism of the call setup process. Therefore, when the ICS UE initiates the second ICS session, the MSC server or the MGCF cannot support the forking.

SUMMARY OF THE INVENTION

In order to solve a problem that, an MSC server or an MGCF does not support early media because an existing CS bearer is reused and thereby a CS call setup process does not exist when an ICS UE initiates a second ICS session, the embodiments of the present invention provide a service control method and apparatus, and the solutions are as follows:

An embodiment of the present invention provides a service control method, where a user equipment has established a circuit switched bearer, and the user equipment initiates a session with a third party. The method includes:

receiving, by a service centralization and continuity application server SCC AS, early session media information, and sending the early session media information to a circuit switched network in a form of regular session media, so that the circuit switched bearer is used for an early session;

receiving, by the SCC AS, an off-hook signal of the third party, and sending regular session media information of the third party to the circuit switched network, so that the circuit switched bearer is used for a regular session; or receiving, by the SCC AS, the regular session media information of the third party, where the regular session media information of the third party and the early session media information come from one same dialog, and sending the regular session media information of the third party to the circuit switched network, so that the circuit switched bearer is used for the regular session.

An embodiment of the present invention provides a service control method, where a user equipment has established a circuit switched bearer, and the user equipment initiates a session with a third party. The method includes:

receiving, by a service centralization and continuity application server SCC AS, regular session media information of a first user equipment of the third party, and sending the regular session media information of the first user equipment of the third party to a circuit switched network, so that the circuit switched bearer is used for connecting the first user equipment of the third party; and receiving, by the SCC AS, an off-hook signal of a second user equipment of the third party, and sending regular session media information of the second user equipment of the third party to the circuit switched network, so that the circuit switched bearer is used for connecting the second user equipment of the third party.

An embodiment of the present invention provides a service control method, where a user equipment has established a circuit switched bearer, and the user equipment initiates a session with a third party. The method includes:

receiving, by the user equipment, early session media information, and using the circuit switched bearer to perform an early session; and receiving, by the user equipment, an off-hook signal of the third party, and using the circuit switched bearer to perform a regular session.

An embodiment of the present invention provides a service control method, where a user equipment has established a circuit switched bearer, and the user equipment initiates a session with a third party. The method includes:

receiving, by the user equipment, media information of a first user equipment of the third party, and using the circuit switched bearer to connect the first user equipment of the third party; and receiving, by the user equipment, an off-hook signal of a second user equipment of the third party, and using the circuit switched bearer to perform a regular session with the second user equipment of the third party.

An embodiment of the present invention provides a service centralization and continuity application server SCC AS, where a user equipment has established a circuit switched bearer, and the user equipment initiates a session with a third party. The SCC AS includes:

an early session media information processing module, configured to receive early session media information, and send the early session media information to a circuit switched network in a form of regular session media, so that the circuit switched bearer is used for an early session; and a regular session media information processing module, configured to receive an off-hook signal of the third party, and send regular session media information of the third party to the circuit switched network, so that the circuit switched bearer is used for a regular session; or configured to receive the regular session media information of the third party, where the regular session media information of the third party and the early session media information come from one same dialog, and send the regular session media information of the third party to the circuit switched network, so that the circuit switched bearer is used for the regular session.

An embodiment of the present invention further provides a service centralization and continuity application server SCC AS, where a user equipment has established a circuit switched bearer, and the user equipment initiates a session with a third party. The SCC AS includes:

a first user equipment processing module, configured to receive regular session media information of a first user equipment of the third party, and send the regular session media information of the first user equipment of the third party to a circuit switched network, so that the circuit switched bearer is used for connecting the first user equipment of the third party; and a second user equipment processing module, configured to receive an off-hook signal of a second user equipment of the third party, and send regular session media information of the second user equipment of the third party to the circuit switched network, so that the circuit switched bearer is used for connecting the second user equipment of the third party.

In the solutions according to the embodiments of the present invention, the SCC AS sends the early session media information to the CS network in the form of regular session media, or the SCC AS saves second regular session media information caused by forking execution instead of immediately sending the information to the CS network, thereby screening the early session or forking execution for the MSC Server or the MGCF of the CS network during a setup process of the second ICS session, and solving problems that the MSC server or the MGCF does not support the early media and that when the ICS UE initiates the second ICS session, forking of multiple user equipments of a called party (the third party) cannot be supported. Therefore, the use experience is improved.

DETAILED DESCRIPTION OF THE EMBODIMENTS

To make the objectives, the technical solutions, and advantages of the present invention more clearly, embodiments of the present invention are described in more detail in the following with reference to the accompanying drawings.

Embodiment 1

Figure 1:
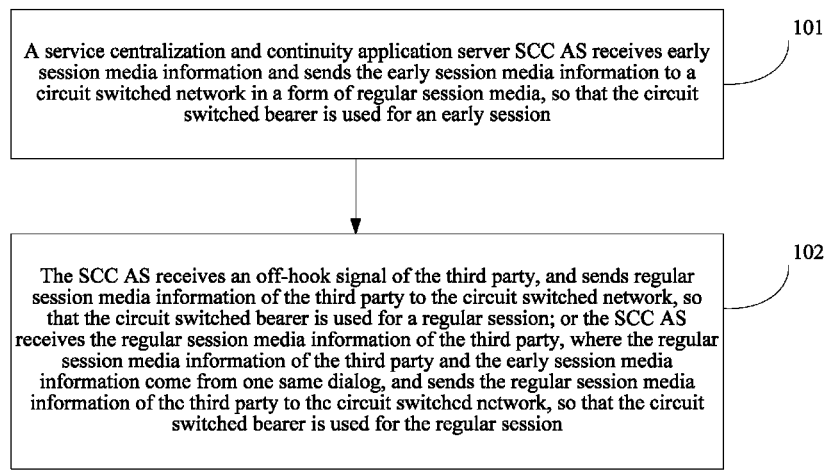
FIG. 1 is a schematic diagram of processing of a service control method according to Embodiment 1 of the present invention.

This embodiment of the present invention provides a service control method, where a user equipment has established a circuit switched bearer, and the user equipment initiates a session with a third party. Referring to FIG. 1, the method includes the following steps:

101: A service centralization and continuity application server SCC AS receives early session media information and sends the early session media information to a circuit switched network in a form of regular session media, so that the circuit switched bearer is used for an early session.

102: The SCC AS receives an off-hook signal of the third party, and sends regular session media information of the third party to the circuit switched network, so that the circuit switched bearer is used for a regular session; or the SCC AS receives the regular session media information of the third party, where the regular session media information of the third party and the early session media information come from one same dialog, and sends the regular session media information of the third party to the circuit switched network, so that the circuit switched bearer is used for the regular session.

A manner for obtaining the regular session media information of the third party includes:

receiving and saving, by the SCC AS, the regular session media information of the third party when or before the SCC AS receives the off-hook signal of the third party; or obtaining, by the SCC AS, the regular session media information from the third party after the SCC AS receives the off-hook signal of the third party; or receiving and saving, by the SCC AS, the regular session media information of the third party when or before the SCC AS receives the early session media information.

A gateway model or a forking model or an early-session model is used for the early session.

Figure 2:
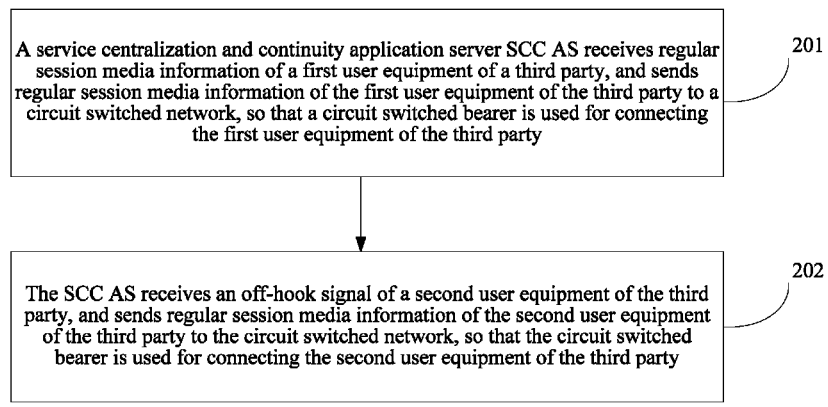
FIG. 2 is a schematic diagram of processing of another service control method according to Embodiment 1 of the present invention.

This embodiment of the present invention further provides a service control method, where a user equipment has established a circuit switched bearer, and the user equipment initiates a session with a third party. Referring to FIG. 2, the method includes the following steps:

201: A service centralization and continuity application server SCC AS receives regular session media information of a first user equipment of the third party, and sends the regular session media information of the first user equipment of the third party to a circuit switched network, so that the circuit switched bearer is used for connecting the first user equipment of the third party.

202: The SCC AS receives an off-hook signal of a second user equipment of the third party, and sends regular session media information of the second user equipment of the third party to the circuit switched network, so that the circuit switched bearer is used for connecting the second user equipment of the third party.

A manner for obtaining the regular session media information of the second user equipment of the third party include:

receiving and saving, by the SCC AS, the regular session media information of the second user equipment of the third party when or before the SCC AS receives the off-hook signal of the second user equipment of the third party; or obtaining, by the SCC AS, the regular session media information from the second user equipment of the third party after the SCC AS receives the off-hook signal of the second user equipment of the third party.

This embodiment of the present invention further provides a service control method, where a user equipment has established a circuit switched bearer, and the user equipment initiates a session with a third party. The method includes:

receiving, by the user equipment, early session media information, and using the circuit switched bearer to perform an early session; and receiving, by the user equipment, an off-hook signal of the third party, and using the circuit switched bearer to perform a regular session.

This embodiment of the present invention further provides a service control method, where a user equipment has established a circuit switched bearer, and the user equipment initiates a session with a third party. The method includes:

receiving, by the user equipment, media information of a first user equipment of the third party, and using the circuit switched bearer to connect the first user equipment of the third party; and receiving, by the user equipment, an off-hook signal of a second user equipment of the third party, and using the circuit switched bearer to perform a regular session with the second user equipment of the third party.

In the methods provided in this embodiment of the present invention, the SCC AS sends the early session media information to the CS network in the form of regular session media, or the SCC AS saves second regular session media information caused by forking execution instead of immediately sending the information to the CS network, thereby screening the early session or forking execution for the MSC Server or the MGCF of the CS network during a setup process of a second ICS session, and solving problems that the MSC server or the MGCF does not support the early media and that when an ICS UE initiates the second ICS session, forking of multiple user equipments of a called party (the third party) cannot be supported. Therefore, use experience of a user is improved.

Embodiment 2

For a scenario where a forking model is used for a CAT service during setup of a second ICS session, this embodiment of the present invention provides a service control method, the specific content is as follows:

(1) An SCC AS receives a forking response carrying CAT media information first.

When receiving the forking response carrying the CAT media information, the SCC AS sends the CAT media information carried in the response to an MSC Server or an MGCF, so as to connect a CS bearer and a CAT media server. The CAT media server may be integrated with a CAT application server (CAT AS), or may also be an independent media processing server for playing CAT media streams. After receiving an off-hook signal, the SCC AS sends regular session media information of a called party (a third party) to the MSC Server or the MGCF (the MSC Server or the MSC is an edge device of a CS network and used for interconnection between the CS network and an IMS network) by using an UPDATE or re-INVITE method, so as to connect the CS bearer and the called party (the third party).

Figure 3:
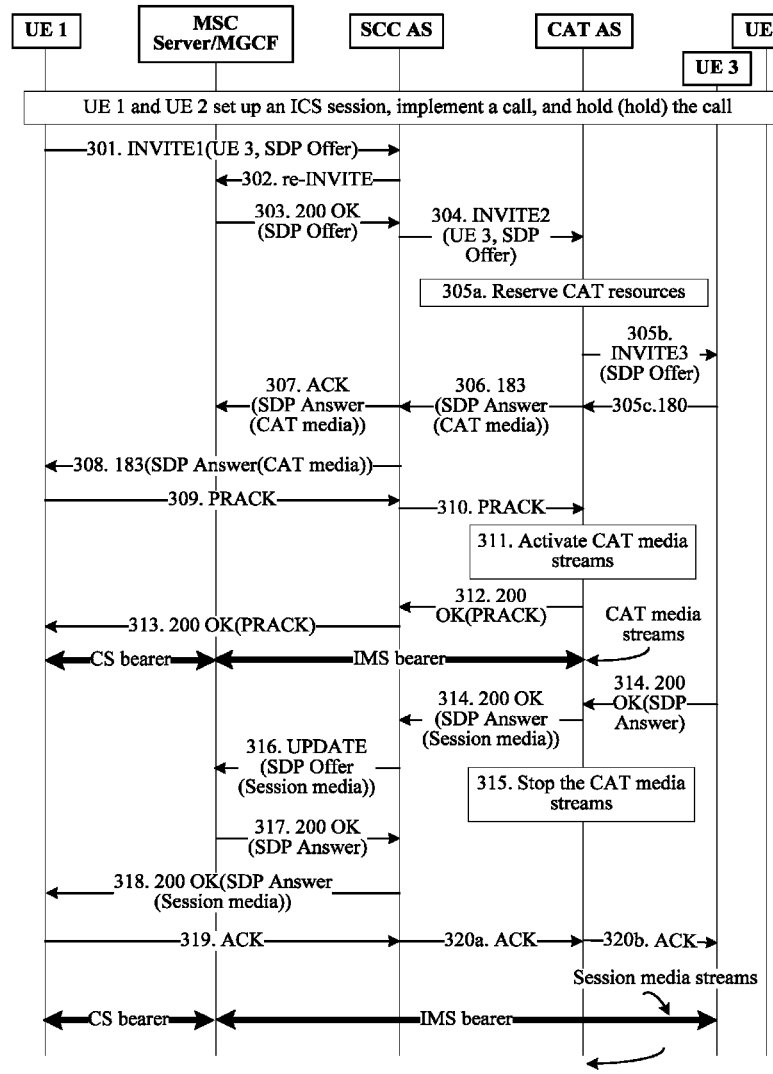
FIG. 3 is a schematic flow chart of a service control method when an SCC AS receives a forking response carrying CAT media information first according to Embodiment 2 of the present invention.

First, UE 1 (an ICS UE) and UE 2 have already set up an ICS session (UE 1 transmits service control signaling with the SCC AS by using a Gm interface, where the GM interface is implemented through a PS network), and implement a call. Session media streams are transmitted through the CS bearer. Then, UE 1 holds (hold) the session and initiates a session with UE 3 (the third party). Referring to FIG. 3, the specific processing process is as follows:

301: UE 1 sends a SIP INVITE 1 message to the SCC AS through the Gm interface, to initiate a session with UE 3.

The INVITE message includes an SDP offer 1, where the SDP offer 1 indicates that the session uses the CS bearer. SDP stands for the session description protocol, and an SDP offer/answer mechanism is used to perform session negotiation.

SIP stands for the session initiation protocol, and all messages in this process are SIP messages.

302: The SCC AS receives the SIP INVITE 1 message, and sends a re-INVITE that does not carry the SDP offer 1 to the MSC Server or the MGCF.

303: The MSC Server or the MGCF returns 200 OK that includes an SDP offer 2, where the SDP offer 2 carries media information of the CS bearer.

If the SCC AS has already saved the media information of the CS bearer, steps 302 and 303 may be skipped.

304: The SCC AS generates a new SDP offer 3 based on the SDP offer 1 and the SDP offer 2, and sends the SDP offer 3 to a CAT AS through a new INVITE 2.

The CAT AS is a home AS of UE 3.

305a-305c: The CAT AS reserves CAT resources; the CAT AS forwards the SDP offer 3 to UE 3 through a new INVITE 3; and UE 3 returns a 180 response to the CAT AS.

306: The CAT AS sends a reliable temporary response, namely, a 183 response, to the SCC AS.

The 183 response includes an SDP answer 3 for the SDP Offer 3, where the SDP answer 3 includes CAT media information. A P-Early-Media header field may be used to indicate existence of CAT early media information (for example, P-Early-Media: sendrecv, and P-Early-Media: sendonly). Definitely, any other manner may also be used for indication, which is not limited in this embodiment of the present invention.

307: The SCC AS sends an ACK to the MGCF or the MSC Server.

The ACK sent by the SCC AS includes an SDP answer 2 for the SDP Offer 2, where the SDP answer 2 includes the CAT media information (or may include a part of the CAT media information, and the rest part of the CAT media information may be transmitted through the PS network), so that the CS bearer is connected to the CAT media server.

The ACK carries the CAT media information in the form of regular session media information, that is, the ACK does not include early media indication information. The MSC Server or the MGCF regards that the media information is used for a regular session.

If steps 302, 303 and 307 are not performed, the SCC AS sends the CAT media information to the MGCF or the MSC Server through an UPDATE or a re-INVITE.

308: The SCC AS sends a reliable temporary response, for example, a 183 response, which includes an SDP answer 1 for the SDP Offer 1, to UE 1 through the Gm interface, where the SDP answer includes the CAT media information, which mainly enables UE 1 to know existence of the CAT service and/or to perform a CAT control operation. It is also possible that a part of the CAT media streams is transmitted through the PS network.

309: UE 1 returns a PRACK to the SCC AS, which serves as an acknowledgment for the received reliable temporary response, namely, the 183 response.

310: The SCC AS sends a PRACK to the CAT AS, which serves as an acknowledgment for the received reliable temporary response, namely, the 183 response.

311: The CAT AS activates the CAT media streams.

312: The CAT AS returns 200 OK to the SCC AS, which serves as an acknowledgment for the PRACK.

313: The SCC AS sends 200 OK to UE 1, which serves as an acknowledgment for the PRACK.

According to the preceding process 301-313, UE1 is connected to the CAT media server through the CS bearer, so that the CAT service is performed when UE 1 and UE 3 set up a second ICS session (that is, UE 1 receives the CAT media streams through the CS bearer). The following steps describe that UE 1 is connected to UE 3 through the CS bearer to implement a practical call, and are specifically as follows:

314: The CAT AS receives a 200 OK off-hook signal that is sent by UE 3 and includes an SDP answer 4 for the SDP Offer 3, where the SDP answer 4 includes regular session media information (that is, media information of UE 3), and the CAT AS sends the 200 OK off-hook signal to the SCC AS to forward the regular session media information.

The off-hook signal 200 OK is meanwhile a forking response, that is, a 200 OK response and the 183 response in step 306 are sent by the SCC AS through two dialogs (dialogs), respectively.

315: The CAT AS stops the CAT media streams.

316: The SCC AS sends an UPDATE or a re-INVITE that includes a new SDP offer 4 to the MGCF or the MSC Server, where the SDP offer 4 includes the regular session media information of UE 3.

317: The MGCF or the MSC Server returns 200 OK that includes an SDP answer 5 to the SCC AS, where the SDP answer 5 includes the media information of the CS bearer.

At this time, the SCC AS does not necessarily send the media information of the CS bearer to UE 3, because UE 3 has obtained the media information of the CS bearer through the SDP Offer 3 sent by the CAT AS in step 305.

318: The SCC AS sends a 200 OK off-hook signal that includes an SDP answer 6 for the SDP offer 1 to UE 1, to indicate that the session setup is successful, where the SDP answer 6 carries the regular session media information.

319: UE 1 sends an ACK to the SCC AS, which serves as an acknowledgment for the 200 OK.

320a-320b: The SCC AS sends an ACK to the CAT AS, and the CAT AS sends an ACK to UE 3.

Till now, a media connection is established between UE 3 and the CS bearer. UE 1 transmits the session media streams with UE 3 through the CS bearer to perform the regular session (that is, the practical call). The preceding process is also applicable to a case of I1 interface, where UE 1 transmits service control signaling with the SCC AS by using the I1 interface (the I1 interface is implemented through the CS network), and a protocol used is an I1 application protocol.

(2) After an SCC AS receives a forking response carrying regular session media information first before receiving a forking response carrying CAT media information, and the following two processing methods exist:

Processing method 1: Send the regular session media information to an MSC Server or an MGCF through an ACK, so that a CS bearer is connected to UE 3.

When the SCC AS decides that this session setup does not activate a CAT service (for example, a calling UE 1 user forbids the CAT service, or a home IMS network of UE 1 forbids the CAT service), that is, the SCC AS decides that no CAT media information will be received subsequently, this method may be adopted.

If the SCC AS subsequently receives the forking response carrying the CAT media information, the SCC AS needs to connect the CS bearer to a CAT media server again.

Processing method 2: The SCC AS waits a certain period of time (the waiting time may be set flexibly). If a forking response carrying the CAT media information is received within a certain period of time (for example, 0.2 s), the CAT media information is sent to the MSC Server or the MGCF through an ACK, so that the CS bearer is connected to the CAT media server. If a forking response carrying the CAT media information is not received during a certain period of time (for example, 0.2 s), it is assumed that no CAT service is activated, and an operation of connecting the CS bearer to called UE 3 is performed.

Figure 4:
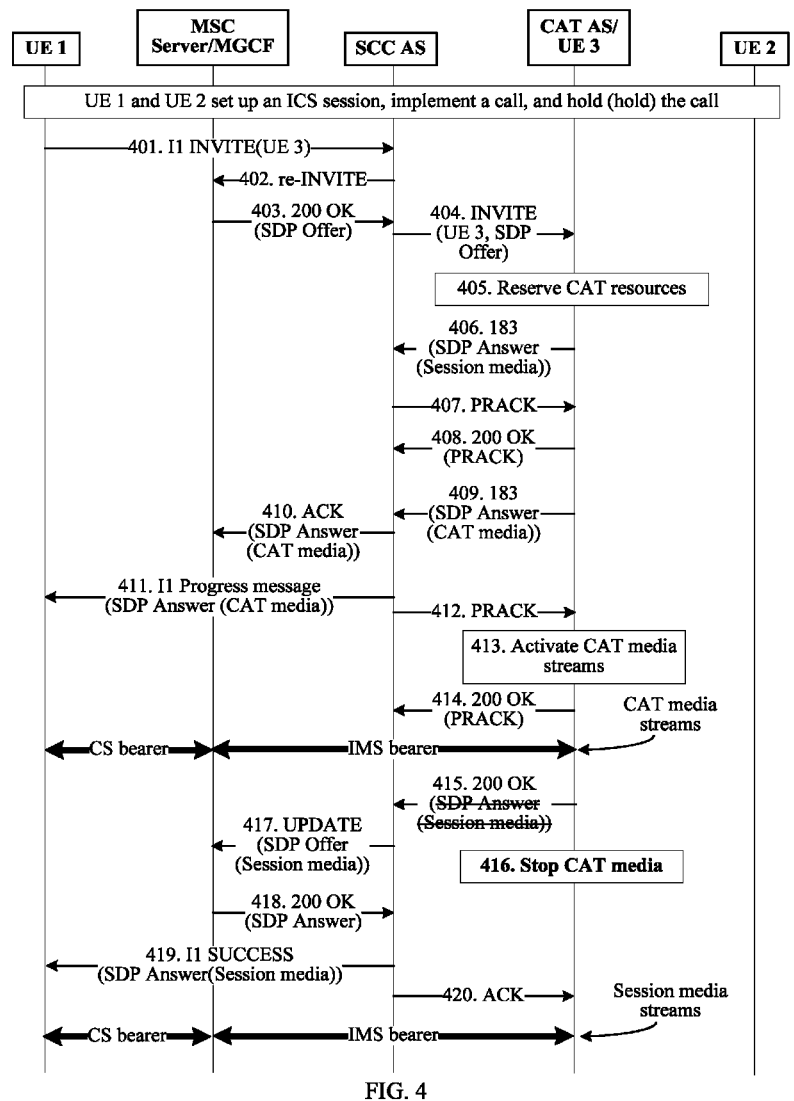
FIG. 4 is a schematic flow chart of a service control method when an SCC AS receives a forking response carrying regular session media information first according to Embodiment 2 of the present invention.

Referring to FIG. 4, the second processing method is taken as an example below to describe the specific processing process:

First, UE 1 (an ICS UE) and UE 2 have already set up an ICS session (UE 1 transmits service control signaling with the SCC AS by using an I1 interface, where the adopted protocol is an I1 application protocol), and implement a call. Session media streams are transmitted through the CS bearer. Then, UE 1 holds (hold) the session and initiates a session with UE 3.

401: UE 1 sends an I1 INVITE message to the SCC AS through the I1 interface, to initiate the session with UE 3, where the I1 INVITE message is a session initiation message defined on the I1 interface and is an I1 application protocol message rather than a SIP protocol message. Different from the SIP protocol, the I1 application protocol is a lightweight protocol, and a message of the I1 application protocol cannot include an SDP offer/answer. In this process, all the I1 protocol messages carry an I1 prefix, and other messages are SIP messages.

402: The SCC AS sends a re-INVITE that does not carry an SDP offer 1 to the MSC Server or the MGCF.

If the SCC AS has already saved the media information of the CS bearer, steps 402 and 403 may be skipped.

403: The MSC Server or the MGCF returns 200 OK that includes an SDP offer 2, where the SDP offer 2 carries the media information of the CS bearer.

404: The SCC AS generates a new SDP offer 3 based on the received I1 INVITE and SDP offer 2, and sends the SDP offer 3 to a CAT AS through an INVITE 2.

The CAT AS is a home AS of UE 3.

405: The CAT AS reserves CAT resources; the CAT AS forwards the SDP offer 3 to UE 3; and UE 3 returns a 180 response to the CAT AS.

406: The CAT AS sends a reliable temporary response, namely, a 183 response, to the SCC AS.

The 183 response includes an SDP answer 3 for the SDP Offer 3, where the SDP answer 3 includes regular session media information, that is, media information of UE 3. The SCC AS may save the regular session media information or save only media information of the part of regular session media that is transmitted by using the CS bearer, and then waits a certain period of time for the CAT media information, where the waiting time may be set flexibly according to an actual situation, which is not limited in this embodiment of the present invention.

407: The SCC AS sends a PRACK to the CAT AS, which serves as an acknowledgment for the received reliable temporary response, namely, the 183 response.

408: The CAT AS returns 200 OK to the SCC AS, which serves as an acknowledgment for the PRACK.

409: In a certain waiting time, the CAT AS sends a reliable temporary response, namely, a 183 response, to the SCC AS, where the 183 response includes an SDP answer 4 for the SDP Offer 3, and the SDP answer 4 includes the CAT media information. This 183 response and the 183 response in step 406 are sent through two dialogs (dialogs), respectively, that is, the CAT AS performs a forking function.

410: The SCC AS sends an ACK that includes an SDP answer 2 for the SDP Offer 2 to the MGCF or the MSC Server, where the SDP answer 2 includes the CAT media information, so that the CS bearer is connected to the CAT media server.

The ACK carries the CAT media information in a form of regular session media information, that is, the ACK does not include early media indication information. The MSC Server or the MGCF regards that the media information is used for a regular session.

If steps 402, 403 and 410 are not performed, the SCC AS sends the CAT media information to the MGCF or the MSC Server through an UPDATE or a re-INVITE.

411: The SCC AS sends an I1 Progress message that includes a ringing indication to UE 1.

412: The SCC AS sends a PRACK to the CAT AS, which serves as an acknowledgment for the received reliable temporary response, namely, the 183 response.

413: The CAT AS activates CAT media streams.

414: The CAT AS returns 200 OK, which serves as an acknowledgment for the PRACK.

At this time, UE1 is connected to the CAT media server through the CS bearer, so that the CAT service is performed when UE 1 and UE 3 set up a second ICS session (that is, UE 1 receives the CAT media streams through the CS bearer). The following steps describe that UE 1 is connected to UE 3 through the CS bearer to implement a practical call, which are specifically as follows:

415: The CAT AS receives a 200 OK off-hook signal sent by UE 3, and sends the 200 OK off-hook signal to the SCC AS.

416: The CAT AS stops the CAT media streams.

417: The SCC AS sends an UPDATE (or a re-INVITE) that includes a new SDP offer 4 to the MGCF or the MSC Server, where the SDP offer 4 carries the saved regular session media information.

418: The MGCF or the MSC Server returns 200 OK to the SCC AS.

419: The SCC AS sends an I1 SUCCESS message to UE 1, to indicate that the session setup is successful.

420: The SCC AS sends an ACK to the CAT AS, and the CAT AS sends an ACK to UE 3.

Till now, a media connection is established between UE 3 and the CS bearer. And UE 1 transmits the session media streams with UE 3 through the CS bearer, to perform the regular session (that is, the practical call).

The preceding process is also applicable to a case of a Gm interface.

In the method according to this embodiment of the present invention, when the forking model is used for the CAT service, the SCC AS receives CAT early session media information through the forking response, and sends the CAT early session media information to the MSC Server or the MGCF of the circuit switched network in the form of regular session media information, so that the circuit switched bearer is used for a CAT early session. The SCC AS receives the off-hook signal of the third party (the off-hook signal and the CAT early session media information come from different dialogs caused by the forking), and sends the regular session media information of the third party to the MSC Server or the MGCF of the circuit switched network, so that the circuit switched bearer is used for the regular session, thereby solving a problem that, when the forking model is used for the CAT service and a second ICS session is set up, the CAT service cannot be used normally. Therefore, use experience of a user is improved.

Embodiment 3

Figure 5:
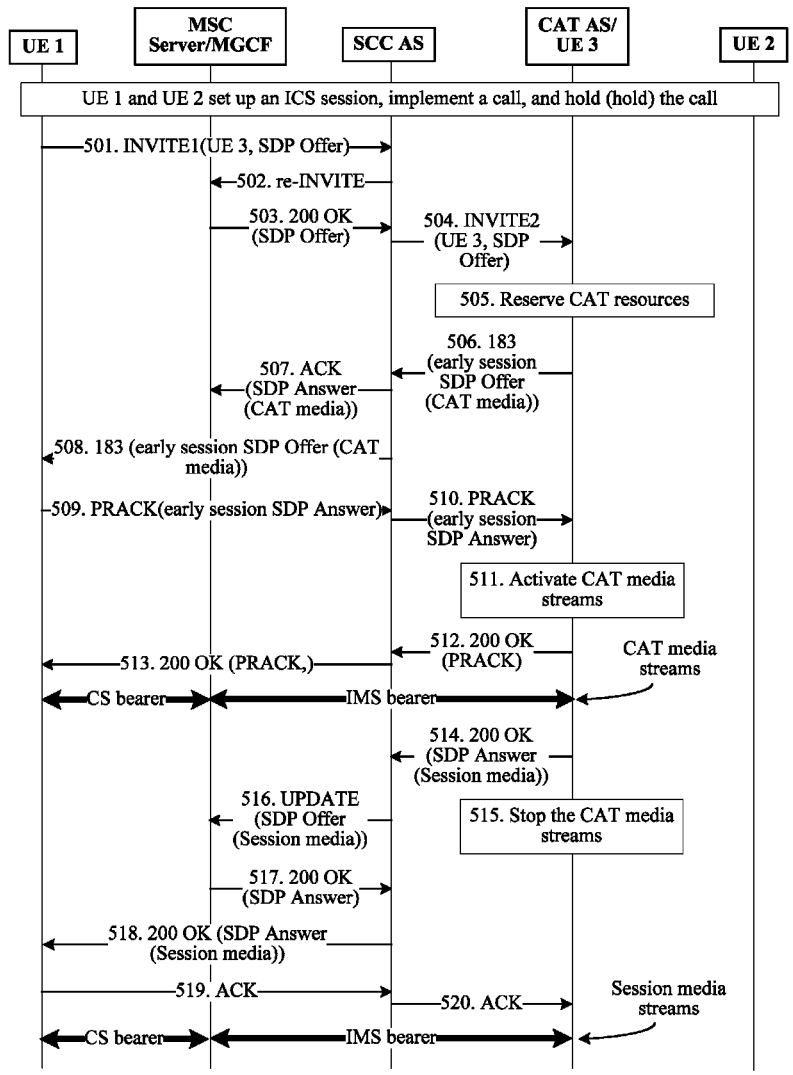
FIG. 5 is a schematic flow chart of a service control method when a 1xx temporary response received by an SCC AS carries an early-session SDP offer but does not carry a regular session SDP answer according to Embodiment 3 of the present invention.

For a scenario where an early-session model is used for a CAT service during setup of a second ICS session, this embodiment of the present invention provides a service control method. A Gm interface is taken as an example for description below, the specific content is as follows:

(1) A reliable temporary response that is received by an SCC AS and carries an early-session SDP offer but does not carry a regular session SDP answer is taken as an application scenario for description. In the following processing process, UE 1 and UE 2 have already set up an ICS session (UE 1 transmits session control signaling with the SCC AS by using a Gm interface), and implement a call. Session media streams are transmitted through a CS bearer. Then, UE 1 holds (hold) the session with UE 2 and initiates a session with UE 3. Referring to FIG. 5, the specific processing process is as follows:

501: UE 1 sends an INVITE 1 message to the SCC AS, to initiate a session with UE 3.

The INVITE message includes an SDP offer 1, where the SDP offer 1 indicates the session uses the CS bearer. SDP stands for the session description protocol, and an SDP offer/answer mechanism is used to perform session negotiation.

502: The SCC AS receives the INVITE 1 message, and sends a re-INVITE that does not carry the SDP offer 1 to an MSC Server or an MGCF.

503: The MSC Server or the MGCF returns 200 OK that includes an SDP offer 2, where the SDP offer 2 carries session media information of the CS bearer.

If the SCC AS has already saved the media information of the CS bearer, steps 502 and 503 may be skipped.

504: The SCC AS generates a new SDP offer 3 based on the SDP offer 1 and the SDP offer 2, and sends the SDP offer 3 to a CAT AS through a new INVITE 2.

The CAT AS is a home AS of UE 3.

505: The CAT AS reserves CAT resources; the CAT AS forwards the SDP offer 3 to UE 3 through a new INVITE 3; and UE 3 returns a 180 response to the CAT AS for acknowledgement.

506: The CAT AS sends a reliable temporary response, for example, a 183 response, to the SCC AS.

The 183 response includes an early-session SDP offer 4 to carry CAT media information. For example, a Content-Disposition header field may be set to early-session, indicating that the 183 response carries the early-session SDP offer. Definitely, any other manner may also be used for indication, which is not limited in this embodiment of the present invention.

507: The SCC AS sends an ACK to the MGCF or the MSC Server.

The ACK sent by the SCC AS includes an SDP answer 2 for the SDP Offer 2, where the SDP answer 2 includes the CAT media information (or may include a part of the CAT media information, and the rest part of the CAT media may be transmitted through a PS domain), so that the CS bearer is connected to a CAT media server.

The ACK carries the CAT media information in a form of regular session media information, that is, the ACK does not include early media indication information. The MSC Server or the MGCF regards that the media information is used for a regular session.

508: The SCC AS sends a reliable temporary response, for example, a 183 response, to UE 1, where the reliable temporary response includes the CAT media information.

509: UE 1 returns a PRACK to the SCC AS, which serves as an acknowledgment for the received reliable temporary response, namely, the 183 response.

510: The SCC AS sends a PRACK that includes an early-session SDP answer 4 for the early-session SDP offer 4 to the CAT AS, which serves as an acknowledgement for the received reliable temporary response, namely, the 183 response.

511: The CAT AS activates CAT media streams.

512: The CAT AS returns 200 OK to the SCC AS, which serves as an acknowledgment for the PRACK.

513: The SCC AS sends 200 OK to UE 1, which serves as an acknowledgment for the PRACK.

According to the preceding process 501-513, UE1 is connected to the CAT media server through the CS bearer, so that the CAT service is performed when UE 1 and the called UE 3 set up a second ICS session (that is, UE 1 receives the CAT media streams through the CS bearer). The following steps describe that UE 1 is connected to the called UE 3 through the CS bearer to implement a practical call, and are specifically as follows:

514: The CAT AS receives a 200 OK off-hook signal (including media information of UE 3) sent by UE 3, sends the 200 OK off-hook signal that includes an SDP answer 3 for the SDP Offer 3 to the SCC AS, where the SDP answer 3 includes the media information of UE 3, that is, regular session media information.

The 200 OK sent by the CAT AS and the 183 response in step 506 use the same Dialog (dialog).

515: The CAT AS stops the CAT media streams.

516: The SCC AS sends an UPDATE or a re-INVITE that includes a new SDP offer 5 to the MGCF or the MSC Server, where the SDP offer 5 includes the regular session media information.

517: The MGCF or the MSC Server returns 200 OK to the SCC AS.

Till now, a media connection is established between UE 3 and the CS bearer.

518: The SCC AS sends a 200 OK off-hook signal that includes an SDP answer 1 for the SDP offer 1 to UE 1, to indicate that the session setup is successful, where the SDP answer 1 carries the regular session media information.

519: UE 1 sends an ACK to the SCC AS, which serves as an acknowledgment for 200 OK.

520: The SCC AS sends an ACK to the CAT AS, and the CAT AS sends an ACK to UE 3.

At this time, a media connection is established between UE 3 and the CS bearer. UE 1 transmits session media streams with UE 3 through the CS bearer, to perform a regular session.

(2) A reliable temporary response that is received by an SCC AS and carries both an early-session SDP offer and a regular session SDP answer is taken as an application scenario for description.

Figure 6:
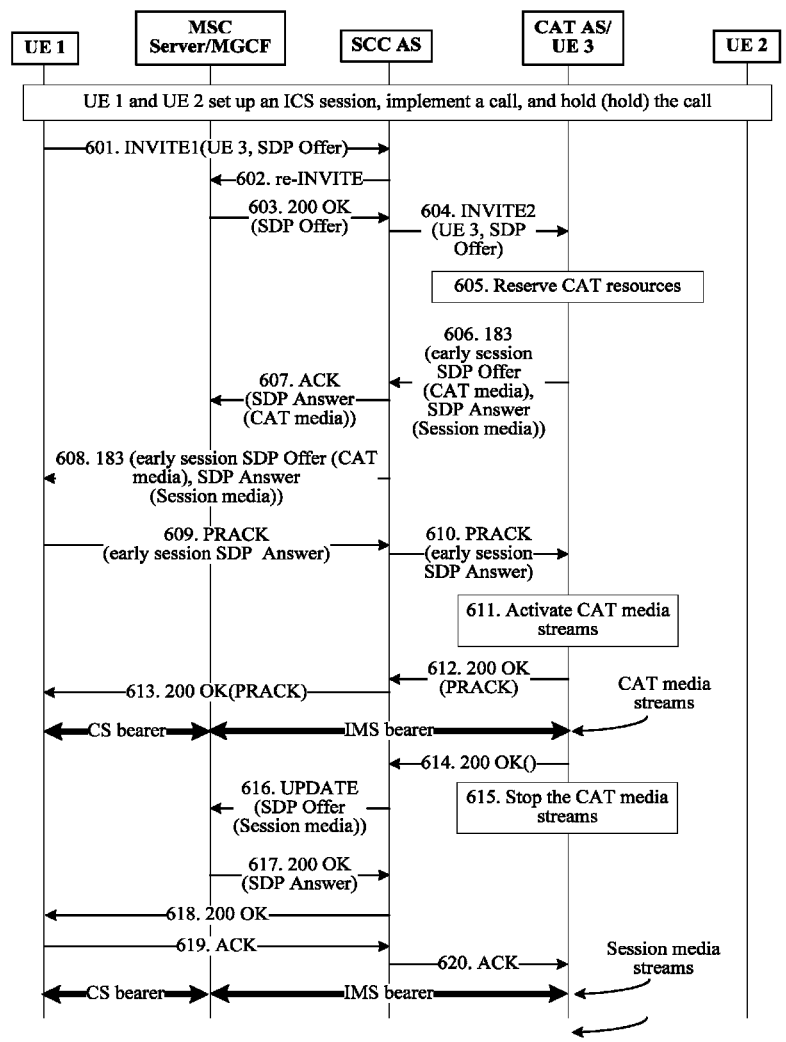
FIG. 6 is a schematic flow chart of a service control method when a 1xx temporary response received by an SCC AS carries both an early-session SDP offer and a regular session SDP answer according to Embodiment 3 of the present invention.

In the following processing process, UE 1 and UE 2 have already set up an ICS session (UE 1 transmits session control signaling with the SCC AS by using a Gm interface), and implement a call. Session media streams are transmitted through a CS bearer. Then, UE 1 holds (hold) UE 2 and initiates a session with UE 3. Referring to FIG. 6, the specific processing process is as follows:

601: UE 1 sends an INVITE 1 message to the SCC AS, to initiate a session with UE 3.

The INVITE message includes an SDP offer 1, where the SDP offer 1 indicates that the session uses the CS bearer. SDP stands for the session description protocol, and an SDP offer/answer mechanism is used to perform session negotiation.

602: The SCC AS receives the INVITE 1 message, and sends a re-INVITE that does not carry the SDP offer 1 to an MSC Server or an MGCF.

603: The MSC Server or the MGCF returns 200 OK that includes an SDP offer 2, where the SDP offer 2 carries session media information of the CS bearer.

If the SCC AS has already saved the media information of the CS bearer, steps 602 and 603 may be skipped.

604: The SCC AS generates a new SDP offer 3 based on the SDP offer 1 and the SDP offer 2, and sends the SDP offer 3 to a CAT AS through a new INVITE 2.

The CAT AS is a home AS of UE 3.

605: The CAT AS reserves CAT resources.

606: The SCC AS receives a reliable temporary response, for example, a 183 response, sent by the CAT AS, where the 183 response includes an early-session SDP offer 4 to carry CAT media information and an SDP answer 3 to carry regular session media information (that is, media information of UE 3), and the SCC AS saves the regular session media information.

607: The SCC AS sends an ACK to the MGCF or the MSC Server.

The ACK sent by the SCC AS includes an SDP answer 2 for the SDP Offer 2, where the SDP answer 2 includes the CAT media information (or may include a part of the CAT media information, and the rest part of the CAT media information may be borne through a PS domain), so that the CS bearer is connected to a CAT media server.

The ACK carries the CAT media information in a form of regular session media information, that is, the ACK does not include early media indication information, so that the MSC Server or the MGCF regards that the media information is used for a regular session.

608: The SCC AS sends a reliable temporary response, for example, a 183 response, which includes the SDP answer 3 and the early-session SDP offer 4 to UE 1, where the early-session SDP offer 4 includes the CAT media information.

609: UE 1 sends a PRACK to the SCC AS, which serves as an acknowledgement for the received reliable temporary response, namely, the 183 response, where the PRACK includes an early-session SDP answer 5 for the early-session SDP offer 4.

610: The SCC AS sends a PRACK to the CAT AS, which serves as an acknowledgement for the received reliable temporary response, namely, the 183 response, where the PRACK includes an early-session SDP answer 4 (generated based on the early-session SDP answer 5 and the media information of the CS bearer) for the early-session SDP offer 4.

611: The CAT AS activates CAT media streams.

612: The CAT AS returns 200 OK to the SCC AS, which serves as an acknowledgment for the PRACK.

613: The SCC AS sends 200 OK to UE 1, which serves as an acknowledgment for the PRACK.

According to the preceding process 601-613, UE1 is connected to the CAT media server through the CS bearer, so that the CAT service is performed when UE 1 and the called UE 3 set up a second ICS session (that is, UE 1 receives the CAT media streams through the CS bearer). The following steps describe that UE 1 is connected to the called UE 3 through the CS bearer to implement a session function, and are specifically as follows:

614: The SCC AS receives a 200 OK off-hook signal sent by the CAT AS.

The 200 OK off-hook signal does not include the regular session media information, and the SCC AS has saved the regular session media information in step 606.

615: The CAT AS stops the CAT media streams.

616: The SCC AS sends an UPDATE or a re-INVITE that includes a new SDP offer 5 to the MGCF or the MSC Server, where the SDP offer 5 includes the regular session media information.

617: The MGCF or the MSC Server returns 200 OK to the SCC AS.

Till now, a media connection is established between UE 3 and the CS bearer.

618: The SCC AS sends 200 OK to UE 1, to indicate that the session setup is successful (UE 3 is already off-hook).

619: UE 1 sends an ACK to the SCC AS, which serves as an acknowledgment for 200 OK.

620: The SCC AS sends an ACK to the CAT AS, and the CAT AS sends an ACK to UE 3.

At this time, UE 1 transmits session media streams with UE 3 through the CS bearer, to perform a regular session.

The Gm interface is taken as an example in this embodiment of the present invention, and the method provided in this embodiment of the present invention is also applicable to an I1 interface.

In the method according to this embodiment of the present invention, in a scenario where the early-session model is used for the CAT service, the SCC AS sends CAT early session media information to the MSC Server or the MGCF of a circuit switched network in the form the regular session media information, where two cases that the received reliable temporary response carries the early session SDP offer but does not carry the regular session SDP answer, and that the received 1xx temporary response carries both the early-session SDP offer and the regular session SDP answer are taken as examples. Therefore, a problem that the CAT service cannot be used normally when the early-session model is used to set up the second ICS session is solved, thereby improving use experience of a user.

In the method according to this embodiment of the present invention, when the early-session model is used for the CAT service, the SCC AS receives the CAT early session media information through the early-session SDP offer, and sends the CAT early session media information to the MSC Server or the MGCF of the circuit switched network in the form of regular session media information, so that the circuit switched bearer is used for a CAT early session. The SCC AS receives the off-hook signal of the third party (the off-hook signal and the CAT early session media information come from the same dialog), and sends the regular session media information of the third party to the MSC Server or the MGCF of the circuit switched network, so that the circuit switched bearer is used for the regular session, thereby solving a problem that the MSC Server or the MGCF cannot support the CAT service when the second ICS session is set up, and improving the use experience of the user.

Embodiment 4

Figure 7:
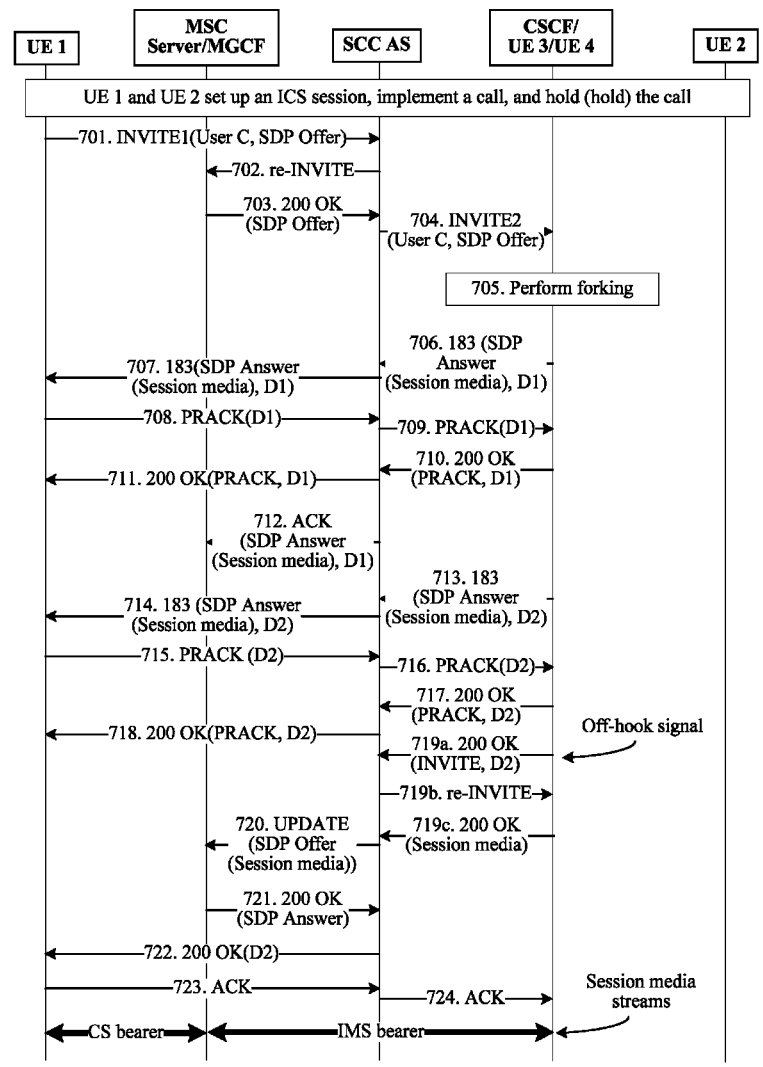
FIG. 7 is a schematic flow chart of a service control method of a forking response that is not caused by CAT according to Embodiment 4 of the present invention.

For a scenario where multiple user equipments of a called party cause a forking response during setup of a second ICS session, this embodiment of the present invention provides a service control method. A Gm interface is taken as an example for description, the specific content is as follows:

First, UE 1 and UE 2 have already set up an ICS session (UE 1 transmits session control signaling with an SCC AS by using a Gm interface), and implement a call. Session media streams are transmitted through a CS bearer. Then, UE 1 holds (hold) UE 2 and initiates a session with UE 3. Referring to FIG. 7, the specific processing process is as follows:

701: UE 1 sends an INVITE 1 message to an SCC AS, to initiate a session with a third party (a user), where the INVITE message includes an SDP offer 1, and the SDP offer 1 indicates that the session uses the CS bearer.

702: The SCC AS receives the INVITE 1 message, and sends a re-INVITE that does not carry the SDP offer to an MSC Server or an MGCF.

703: The MSC Server or the MGCF returns 200 OK that includes an SDP offer 2, where the SDP offer 2 carries media information of the CS bearer.

If the SCC AS has already saved the media information of the CS bearer, steps 702 and 703 may be skipped.

704: The SCC AS generates a new SDP offer 3 based on the SDP offer 1 and the media information of the CS bearer, and sends the SDP offer 3 to a CSCF (Call Session Control Function) of the third party through a new INVITE 2.

705: The CSCF of the third party performs a forking operation on the INVITE 2, thereby forking the INVITE 2 to user equipments 3 and 4 of the third party.

706: A reliable temporary response 183 (including media information) of UE 3 arrives at the SCC AS prior to that of UE 4, where D1 in the figure indicates a SIP Dialog ID1.

707: The SCC AS sends a reliable temporary response 183 that includes media information of UE 3 to UE 1.

708: UE 1 returns a PRACK to the SCC AS, which serves as an acknowledgment for the received reliable temporary response 183.

709: The SCC AS sends a PRACK to UE 3, which serves as an acknowledgment for the received reliable temporary response 183.

710: UE 3 returns 200 OK to the SCC AS, which serves as an acknowledgment for the PRACK.

711: The SCC AS sends 200 OK to UE 1, which serves as an acknowledgment for the PRACK.

712: The SCC AS sends an ACK to the MGCF or the MSC Server, which serves as an acknowledgment for the 200 OK in step 703.

The ACK sent by the SCC AS includes the media information of UE 3, so that the CS bearer is connected to UE 3.

Through the preceding process 701-712, UE 1 is connected to UE 3 through the CS bearer, and waits UE 3 to send an off-hook signal.

If steps 702, 703 and 712 are not performed, the SCC AS sends the media information of UE 3 to the MGCF or the MSC Server through an UPDATE or a re-INVITE, so that the CS bearer is connected to UE 3.

713: A reliable temporary response 183 (including media information) of UE 4 arrives at the SCC AS, where D2 in the figure indicates a SIP Dialog ID2.

714-718: The SCC AS processes the 183 response of UE 4 in the same way as processing of the 183 response of UE 3, except that the media information of UE 4 is not immediately sent to the MGCF or the MSC server.

719a: The off-hook signal of UE 4 arrives at the SCC AS prior to that of UE 3.

719b-719c: The SCC AS obtains the media information from UE 4 through a re-INVITE that does not carry SDP, that is, the SCC AS sends a re-INVITE that does not carry SDP to UE 4, and UE 4 returns the media information through 200 OK; or the SCC AS sends an UPDATE (including the media information of the CS bearer) to UE 4, and UE 4 returns the media information through 200 OK.

720-721: The SCC AS sends the media information of UE 4 to the MGCF or the MSC Server through an UPDATE or a re-INVITE, so that the CS bearer is connected to UE 4.

722-724: The SCC AS sends a 200 OK off-hook signal to UE 1; UE 1 sends an ACK acknowledgment to the SCC AS; and the SCC AS sends an ACK acknowledgement to UE 4.

At this time, a media connection is established between UE 4 and the CS bearer. UE 1 transmits session media streams with UE 4 through the CS bearer, to perform a regular session. UE 3 is released subsequently.

In the method according to this embodiment of the present invention, after receiving media information of a called UE, the SCC AS sends the media information to the MGCF or the MSC Server of a CS network. The SCC AS does not immediately send subsequently received media information of another called UE to the CS network, and after receiving an off-hook signal of a certain called UE, the SCC AS sends media information of the UE to the CS network, thereby solving a problem that the MGCF or the MSC Server cannot support forking of multiple user equipments of a called party (the third party) during the second ICS session, and improving use experience of a user.

Embodiment 5

For a scenario where a gateway model is used for a CAT service during setup of a second ICS session, this embodiment of the present invention provides a service control method, the specific content is as follows:

When receiving a response carrying CAT media information, an SCC AS sends the CAT media information carried in the response to an MSC Server or an MGCF in a form of regular session media information, so as to connect a CS bearer and a CAT media server. The CAT media server may be integrated with a CAT application server (CAT AS, in this embodiment, the CAT AS provides the CAT service by using the gateway model), or may be an independent media processing server for playing CAT media streams. After receiving regular session media information of a called-party UE, the SCC AS sends the regular session media information of the called-party (third-party) UE to the MSC Server or the MGCF (the MSC Server or the MGCF is an edge device of a CS network, and used for interconnection between the CS network and an IMS network) through an UPDATE or a re-INVITE, so as to connect the CS bearer and the called-party (third-party) UE.

Figure 8:
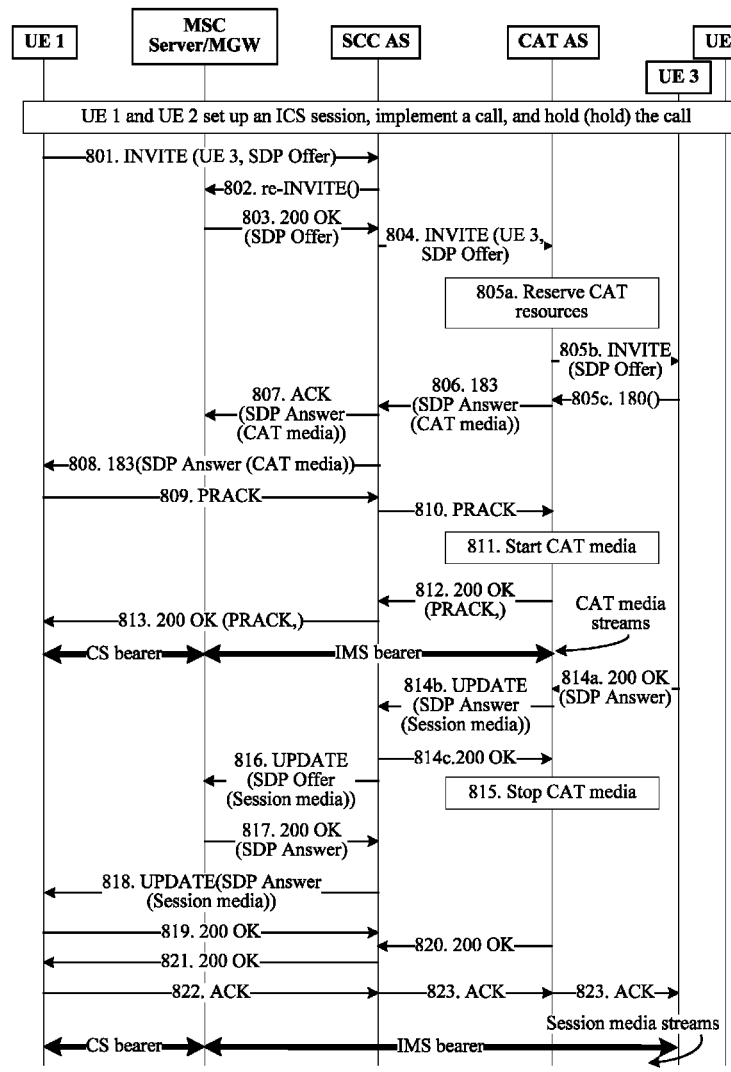
FIG. 8 is a schematic flow chart of a service control method when a gateway model is used according to Embodiment 5 of the present invention.

First, UE 1 (an ICS UE) and UE 2 has set up an ICS session (UE 1 transmits service control signaling with the SCC AS over a Gm interface, where the Gm interface is implemented through a PS network), and implement a call. Session media streams are transmitted through the CS bearer. Then, UE 1 holds (hold) the session and initiates a session with UE 3. Referring to FIG. 8, the specific processing process is as follows:

801: UE 1 sends a SIP INVITE 1 message to the SCC AS through the Gm interface, to initiate a session with UE 3.

The INVITE message includes an SDP offer 1, where the SDP offer 1 indicates that the session uses the CS bearer. SDP stands for the session description protocol, and an SDP offer/answer mechanism is used to perform session negotiation. SIP stands for the session initiation protocol, and all messages in this process are SIP messages.

802: The SCC AS receives the INVITE 1 message, and sends a re-INVITE that does not carry an SDP offer to the MSC Server or the MGCF.

803: The MSC Server or the MGCF returns 200 OK that includes an SDP offer 2, where the SDP offer 2 carries media information of the CS bearer.

If the SCC AS has already saved the media information of the CS bearer, steps 402 and 403 may be skipped.

804: The SCC AS generates a new SDP offer 3 based on the SDP offer 1 and the SDP offer 2, and sends the SDP offer 3 to a CAT AS through a new INVITE 2.

The CAT AS is a home AS of UE 3.

805a-305c: The CAT AS reserves CAT resources; the CAT AS forwards the SDP offer 3 to UE 3 through a new INVITE 3; and UE 3 returns a 180 response to the CAT AS.

806: The CAT AS sends a reliable temporary response, namely, a 183 response, to the SCC AS.

The 183 response includes an SDP answer 3 for the SDP Offer 3, where the SDP answer 3 includes CAT media information, and a P-Early-Media header field (for example, P-Early-Media: sendrecv and P-Early-Media: sendonly) may be used to indicate existence of CAT early media information. Definitely, any other manner may also be used for indication, which is not limited in this embodiment of the present invention.

807: The SCC AS sends an ACK to the MGCF or the MSC Server.

The ACK sent by the SCC AS includes an SDP answer 2 for the SDP Offer 2, where the SDP answer 2 includes the CAT media information (or may include a part of the CAT media information, and the rest part of the CAT media information may be transmitted through the PS network), so that the CS bearer is connected to the CAT media server.

The ACK carries the CAT media information in a form of regular session media information, that is, the ACK does not include early media indication information. The MSC Server or the MGCF regards that the media information is used for a regular session.

If steps 802, 803 and 807 are not performed, the SCC AS sends the CAT media information to the MGCF or the MSC Server through an UPDATE or a re-INVITE.

808: The SCC AS sends a reliable temporary response, for example, a 183 response, which includes an SDP answer 1 for the SDP Offer 1, to UE 1 through the Gm interface, where the SDP answer 1 includes the CAT media information, which mainly enables UE 1 to know existence of the CAT service and/or to perform a CAT control operation. It is also possible that a part of the CAT streams is transmitted through the PS network.

809: UE 1 returns a PRACK to the SCC AS, which serves as an acknowledgment for the received reliable temporary response, namely, the 183 response.

810: The SCC AS sends a PRACK to the CAT AS, which serves as an acknowledgment for the received reliable temporary response, namely, the 183 response.

811: The CAT AS activates the CAT media streams.

812: The CAT AS returns 200 OK to the SCC AS, which serves as an acknowledgment for the PRACK.

813: The SCC AS sends 200 OK to UE 1, which serves as an acknowledgment for the PRACK.

According to the preceding process 801-813, UE1 is connected to the CAT media server through the CS bearer, so that the CAT service is performed when UE 1 and the called UE 3 set up a second ICS session (that is, UE 1 receives the CAT media streams through the CS bearer). The following steps describe that UE 1 is connected to the called UE 3 through the CS bearer to implement a practical call, and are specifically as follows:

814a-814c: The CAT AS receives a 200 OK off-hook signal that is sent by UE 3 and includes an SDP answer 4 for the SDP Offer 3, where the SDP answer 4 includes regular session media information (that is, media information of the called UE 3). The CAT AS sends the regular session media information (serving as the SDP Offer 4) to the SCC AS through an UPDATE or a re-INVITE, and the SCC AS returns 200 OK.

815: The CAT AS stops the CAT media streams.

816: The SCC AS sends an UPDATE or a re-INVITE that includes a new SDP offer 5 to the MGCF or the MSC Server, where the SDP offer 5 includes the regular session media information of UE 3.

817: The MGCF or the MSC Server returns 200 OK to the SCC AS.

818-819: The SCC AS sends an UPDATE (or a re-INVITE) that carries the regular session media information of UE 3 to UE 1, and UE 1 returns 200 OK.

820: The CAT AS sends a 200 OK off-hook signal to the SCC AS.

The off-hook signal 200 OK response, the UPDATE (or re-INVITE) message in step 814, and the 183 response in step 806 are sent through one same dialog (dialog).

821: The SCC AS sends a 200 OK off-hook signal to UE 1, to indicate that the session setup is successful.

822: UE 1 sends an ACK to the SCC AS, which serves as an acknowledgment for the 200 OK.

823: The SCC AS sends an ACK to the CAT AS, and the CAT AS sends an ACK to UE 3.

Till now, a media connection is established between UE 3 and the CS bearer. UE 1 transmits the session media streams with UE 3 through the CS bearer, to perform the regular session (that is, the practical call).

The process is also applicable to a case of I1 interface, with an only difference that, I1 interface application protocol messages rather than SIP messages are used between ICS UE 1 and the SCC AS.

In the method according to this embodiment of the present invention, when the gateway model is used for the CAT service, the SCC AS sends CAT early session media information to the MSC Server or the MGCF in the form of regular session media information, so that the circuit switched bearer is used for a CAT early session. After the SCC AS receives the regular session media information of UE 3, where the regular session media information and the CAT early session media information come from one same dialog, the SCC AS sends the regular session media information to the MSC Server or the MGCF, so that the circuit switched bearer is used for the regular session, thereby solving a problem that the MSC Server or the MGCF cannot support the early session during setup of the second ICS session, and improving use experience of a user.

Embodiment 6

Figure 9:
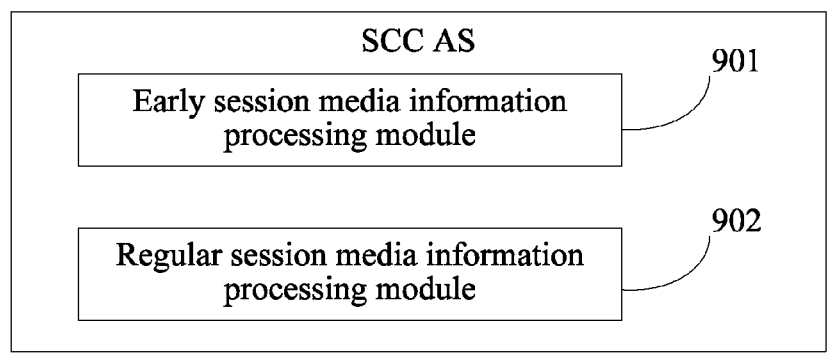
FIG. 9 is a schematic structural diagram of an SCC AS according to Embodiment 6 of the present invention.

Referring to FIG. 9, this embodiment of the present invention provides a service centralization and continuity application server SCC AS, where a user equipment has established a circuit switched bearer, and the user equipment initiates a session with a third party. The SCC AS includes:

an early session media information processing module 901, configured to receive early session media information, and send the early session media information to a circuit switched network in s form of regular session media, so that the circuit switched bearer is used for an early session; and a regular session media information processing module 902, configured to receive an off-hook signal of the third party, and send regular session media information of the third party to the circuit switched network, so that the circuit switched bearer is used for a regular session; or configured to receive the regular session media information of the third party, where the regular session media information of the third party and the early session media information come from one same dialog, and send the regular session media information of the third party to the circuit switched network, so that the circuit switched bearer is used for the regular session.

In this embodiment, the regular session media information processing module 902 includes at least one of the following units:

a first processing unit, configured to receive and save the regular session media information of the third party when or before receiving the off-hook signal of the third party; and a second processing unit, configured to obtain the regular session media information from the third party after receiving the off-hook signal of the third party.

In this embodiment, the early session media information processing module 901 further includes:

a third processing unit, configured to receive and save the regular session media information of the third party when or before receiving the early session media information.

In this embodiment, a gateway model or a forking model or an early-session model is used for the early session.

Figure 10:
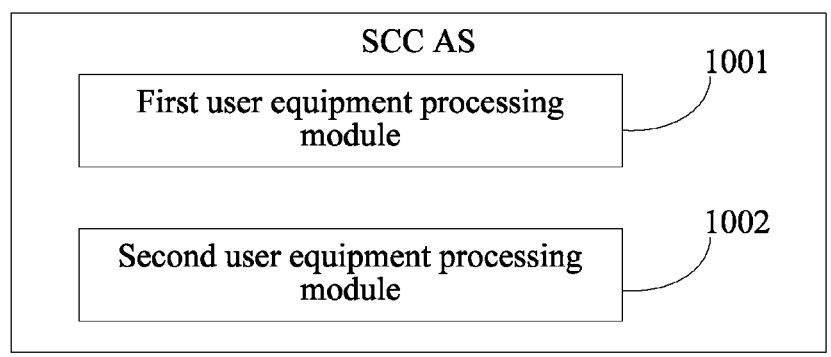
FIG. 10 is a schematic structural diagram of another SCC AS according to Embodiment 6 of the present invention.

In addition, referring to FIG. 10, this embodiment of the present invention further provides a service centralization and continuity application server SCC AS, where a user equipment has established a circuit switched bearer, and the user equipment initiates a session with a third party. The SCC AS includes:

a first user equipment processing module 1001, configured to receive regular session media information of a first user equipment of the third party, and send the regular session media information of the first user equipment of the third party to a circuit switched network, so that the circuit switched bearer is used for connecting the first user equipment of the third party; and a second user equipment processing module 1002, configured to receive an off-hook signal of a second user equipment of the third party, and send regular session media information of the second user equipment of the third party to the circuit switched network, so that the circuit switched bearer is used for connecting the second user equipment of the third party.

In this embodiment, the second user equipment processing module 1002 includes at least one of the following units:

a fourth processing unit, configured to receive and save the regular session media information of the second user equipment of the third party when or before receiving the off-hook signal of the second user equipment of the third party; and a fifth processing unit, configured to obtain the regular session media information from the second user equipment of the third party after receiving the off-hook signal of the second user equipment of the third party.

Embodiment 7

Figure 11:
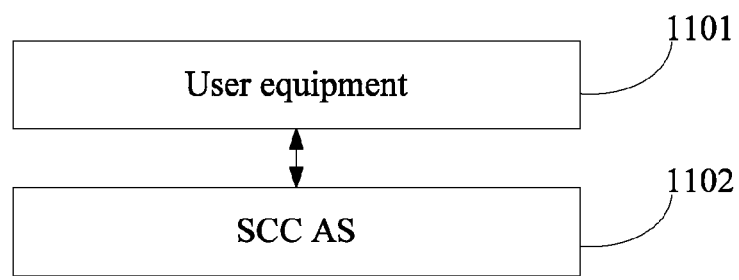
FIG. 11 is a schematic structural diagram of a service control system according to Embodiment 7 of the present invention.

This embodiment of the present invention provides a service control system, and referring to FIG. 11, the system includes a user equipment 1101 and an SCC AS 1102, where the user equipment 1101 is configured to set up a first ICS session with a circuit switched bearer, and initiate a second ICS session with a third party; and the SCC AS 1102 is configured to receive early session media information, and send the early session media information to a circuit switched network, so that the circuit switched bearer is used for an early session; configured to receive an off-hook signal of the third party, and send regular session media information of the third party to the circuit switched network, so that the circuit switched bearer is used for a regular session; and further configured to receive the regular session media information of the third party, where the regular session media information of the third party and the early session media information come from one same dialog, and send the regular session media information of the third party to the circuit switched network, so that the circuit switched bearer is used for the regular session.

The SCC AS 1102 further includes at least one of the following modules:

a first processing module, configured to receive and save the regular session media information of the third party when or before receiving the off-hook signal of the third party;

a second processing module, configured to obtain the regular session media information from the third party after receiving the off-hook signal of the third party; and a third processing module, configured to receive and save the regular session media information of the third party before receiving the early session media information.

Figure 12:
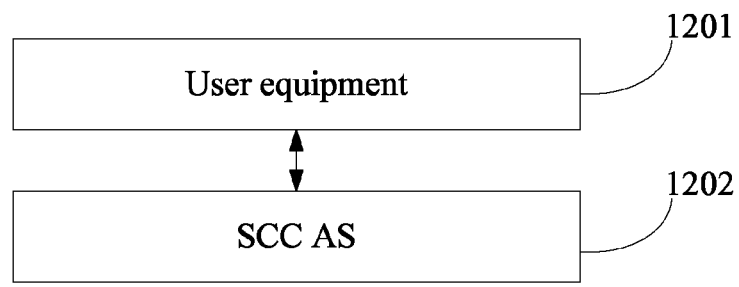
FIG. 12 is a schematic structural diagram of another service control system according to Embodiment 7 of the present invention.

Referring to FIG. 12, this embodiment of the present invention further provides a service control system, which includes a user equipment 1201 and an SCC AS 1202, where the user equipment 1201 is configured to set up a first ICS session with a circuit switched bearer, and initiate a second ICS session with a third party; and the SCC AS 1202 is configured to receive regular session media information of a first user equipment 1201 of the third party, and send regular session media information of the first user equipment 1201 of the third party to a circuit switched network, so that the circuit switched bearer is used for connecting the first user equipment 1201 of the third party; and further configured to receive an off-hook signal of a second user equipment 1201 of the third party, and send regular session media information of the second user equipment 1201 of the third party to the circuit switched network, so that the circuit switched bearer is used for connecting the second user equipment 1201 of the third party.

The SCC AS 1202 further includes at least one of the following modules:

a fourth processing module, configured to receive and save the regular session media information of the second user equipment 1201 of the third party when or before receiving the off-hook signal of the second user equipment 1201 of the third party; and a fifth processing module, configured to obtain the regular session media information from the second user equipment 1201 of the third party after receiving the off-hook signal of the second user equipment 1201 of the third party.

In the system according to this embodiment of the present invention, the SCC AS sends the early session media information to the CS network in the form of regular session media, or the SCC AS saves second regular session media information caused by forking execution instead of immediately sending the information to the CS network, thereby screening the early session or forking execution for the MSC Server or the MGCF of the CS network during a setup process of the second ICS session, and solving problems that the MSC server or the MGCF does not support the early media and that when an ICS UE initiates the second ICS session, forking of multiple user equipments 1201 of a called party (the third party) cannot be supported. Therefore, use experience of a user is improved.

Finally, it should be noted that persons of ordinary skill in the art should understand that all or a part of the processes of the methods according to the embodiments of the present invention may be implemented by a program instructing relevant hardware. The program may be stored in a computer readable storage medium. When the program is run, the processes of the methods according to the embodiments of the present invention are performed. The storage medium may be a magnetic disk, an optical disk, a read-only memory (ROM), a random access memory (RAM), and so on.

The functional units in the embodiments of the present invention may either be integrated in a processing module, or be a separate physical unit respectively; alternatively, two or more of the units may be integrated in one module. The integrated modules may be implemented in the form of hardware or software functional modules. If implemented in the form of software functional modules and sold or used as an independent product, the integrated modules may also be stored in a computer readable storage medium. The storage medium may be a read-only memory, a magnetic disk, an optical disk, and so on. The foregoing apparatuses or systems may perform methods in the corresponding method embodiments.

The preceding embodiments are merely exemplary embodiments of the present invention, and are not intended to limit the present invention. Any modifications, equivalent replacements or improvement without departing the spirit and principle of the present invention shall fall within the protection scope of the present invention.

What is claimed is:

1. A service control method, comprising:
receiving by a service centralization and continuity application server (SCC AS) in an IP multimedia subsystem (IMS) network, from a first user equipment a first session initiation protocol (SIP) message for establishing an IMS centralized service (ICS) session with a second user equipment;
receiving, by the SCC AS in the IMS network, early session media information;
sending, by the SCC AS in the IMS network, a second SIP message carrying the early session media information to a media gateway control device, wherein the early session media information is carried in the second SIP message in a form of regular session media information to indicate the media gateway control device to use an existing circuit switched bearer to transmit early session media corresponding to the early session media information to the first user equipment, wherein the existing circuit switched bearer is established between the first user equipment and the media gateway control device for a session between the first user equipment and a third user equipment;
receiving, by the SCC AS in the IMS network, an off-hook signal from the second user equipment; and
after receiving the off-hook signal, sending by the SCC AS in the IMS network the regular session media information of the second user equipment to the media gateway control device.

2. The method according to claim 1, further comprising:
receiving and saving, by the SCC AS, the regular session media information when or before the SCC AS receives the off-hook signal.

3. The method according to claim 1, further comprising:
obtaining, by the SCC AS, the regular session media information from the third party after the SCC AS receives the off-hook signal.

4. The method according to claim 1, further comprising:
receiving and saving, by the SCC AS, the regular session media information when or before the SCC AS receives the early session media information.

5. The method according to claim 1, wherein the early session media information is carried in a session description protocol (SDP) Answer in the second SIP message, and the SDP does not have an early media indication.

6. The method according to claim 5, wherein the first SIP message is an SIP INVITE message, and the second SIP message is an SIP ACK message.

7. The method according to claim 6, wherein the SCC AS sends the regular session media information to the media gateway control device through an SIP UPDATE message.

8. The method according to claim 1, wherein the early session media is a media of a customized alerting tone.

9. A service centralization and continuity application server (SCC AS), comprising:
a receiver, configured to receive, from a first user equipment, a first session initiation protocol (SIP) message for establishing an IP multimedia subsystem centralized service (ICS) session with a second user equipment, and receive early session media information; and
a transmitter, configured to send a second SIP message carrying the early session media information to a media gateway control device, wherein the early session media information is carried in the second SIP message in a form of regular session media information to indicate the media gateway control device to use an existing circuit switched bearer to transmit early session media corresponding to the early session media information to the first user equipment wherein the existing circuit switched bearer is established between the first user equipment and the media gateway control device for a session between the first user equipment and a third user equipment,
wherein the receiver is further configured to receive an off-hook signal from the second user equipment, and the transmitter is further configured to send regular session media information of the second user equipment to the media gateway control device.

10. The SCC AS according to claim 9, wherein
the receiver receives the regular session media information when receiving the off-hook signal.

11. The SCC AS according to claim 9, wherein
the receiver receives the regular session media information when or before receiving the early session media information.

12. The SCC AS according to claim 9, wherein the receiver receives the regular session media information before receiving the off-hook signal.

13. The SCC AS according to claim 9, wherein the receiver receives the regular session media information after receiving the off-hook signal.

14. The SCC AS according to claim 9, wherein the early session media information is carried in a session description protocol (SDP) Answer in the second SIP message, and the SDP does not have an early media indication.

15. The SCC AS according to claim 14, wherein the first SIP message is an SIP INVITE message, and the second SIP message is an SIP ACK message.

16. The SCC AS according to claim 15, wherein the transmitter sends the regular session media information to the media gateway control device through an SIP UPDATE message.

17. A method for service control, comprising:
establishing, by a media gateway control device, a circuit switched bearer with a first user equipment for a first IP multimedia subsystem (IMS) centralized service session between the first user equipment and a second equipment;
receiving, by the media gateway control device, from a service centralization and continuity application server (SCC AS) in an IMS network, a first session initiation protocol (SIP) message for establishing a second IMS centralized service session between the first user equipment and a third user equipment;
receiving, by the media gateway control device, a second SIP message from the SCC AS, wherein the second SIP message carries early session media information in a form of regular session media information for indicating the media gateway control device to use the circuit switched bearer between the first user equipment and the media gateway control device to transmit early session media corresponding to the early session media information to the first user equipment;

sending, by the media gateway control device, the early session media to the first user equipment through the circuit switched bearer between the first user equipment and the media gateway control device;

receiving, by the media gateway control device, from the SCC AS regular session media information of the third user equipment; and sending, by the media gateway control device, media of a regular session to the first user equipment through the circuit switched bearer between the first user equipment and the media gateway control device.

18. The method according to claim 17, wherein the media gateway control device is a mobile switching center (MSC) server.

19. The method according to claim 17, wherein the second SIP message includes a session description protocol (SDP) Answer without an early media indication.

20. The method according to claim 17, wherein the first SIP message is a re-INVITE message and the second SIP message is an SIP ACK message.

21. The method according to claim 20, wherein the media gateway control device receives an SIP UPDATE message including the regular session media information.

22. A media gateway control device, comprising:
a processor, coupled to a non-transitory computer readable medium having a computer readable instruction stored thereon that, when executed by the processor, causes the processor to establish a circuit switched bearer between the media gateway control device and a first user equipment for a first IP multimedia subsystem (IMS) centralized service session between the first user equipment and a second equipment;
a receiver configured to:
  receive, from a service centralization and continuity application server (SCC AS), a first session initiation protocol (SIP) message for establishing a second IMS centralized service session between the first user equipment and a third user equipment;
  receive, from the SCC AS, a second SIP message, wherein the second SIP message carries early session media information in a form of regular session media information for indicating the media gateway control device to use the circuit switched bearer between the first user equipment and the media gateway control device to transmit early session media; and
a transmitter, configured to send the early session media to the first user equipment through the circuit switched bearer between the first user equipment and the media gateway control device,
wherein the receiver is further configured to receive from the SCC AS regular session media information of the third user equipment, and the transmitter is further configured to send media of a regular session to the first user equipment through the circuit switched bearer between the first user equipment and the media gateway control device.

23. The media gateway control device according to claim 22, wherein the media gateway control device is a mobile switching center (MSC) server.

24. The media gateway control device according to claim 22, wherein the second SIP message includes a session description protocol (SDP) Answer without an early media indication.

25. The media gateway control device according to claim 22, wherein the first SIP message is re-INVITE message and the second SIP message is SIP ACK message.

26. The media gateway control device according to claim 25, wherein the receiver receives an SIP UPDATE message including the regular session media information.

* * * * *

UNITED STATES PATENT AND TRADEMARK OFFICE
CERTIFICATE OF CORRECTION

| | | |
|---|---|---|
| PATENT NO. | : 9,007,996 B2 | Page 1 of 1 |
| APPLICATION NO. | : 13/602876 | |
| DATED | : April 14, 2015 | |
| INVENTOR(S) | : Long et al. | |

It is certified that error appears in the above-identified patent and that said Letters Patent is hereby corrected as shown below:

In the Claims

Column 21, line 50, "from the third party" should be removed.

Signed and Sealed this
Twenty-fourth Day of November, 2015

Michelle K. Lee
*Director of the United States Patent and Trademark Office*